United States Patent
Subbloie et al.

(10) Patent No.: US 12,547,137 B2
(45) Date of Patent: Feb. 10, 2026

(54) ENERGY SAVINGS QUANTIFICATION MEASUREMENT AND BUDGET CONTROL SYSTEM

(71) Applicant: Budderfly, Inc., Shelton, CT (US)

(72) Inventors: Albert Subbloie, Orange, CT (US); Paul Schmidt, Rocky Hill, CT (US); Christopher J. DeBenedictis, Branford, CT (US); Jaan Leemet, Aventura, FL (US)

(73) Assignee: Budderfly, Inc., Shelton, CT (US)

( * ) Notice: Subject to any disclaimer, the term of this patent is extended or adjusted under 35 U.S.C. 154(b) by 527 days.

(21) Appl. No.: 18/145,250

(22) Filed: Dec. 22, 2022

(65) Prior Publication Data

US 2023/0221691 A1 Jul. 13, 2023

Related U.S. Application Data

(60) Provisional application No. 63/295,453, filed on Dec. 30, 2021.

(51) Int. Cl.
    *G05B 19/042* (2006.01)
(52) U.S. Cl.
    CPC .... *G05B 19/042* (2013.01); *G05B 2219/2639* (2013.01)
(58) Field of Classification Search
    CPC ............... G05B 19/042; G05B 2219/2639
    See application file for complete search history.

(56) References Cited

U.S. PATENT DOCUMENTS

| | | | |
|---|---|---|---|
| 2014/0058572 A1* | 2/2014 | Stein | G06Q 50/06 700/291 |
| 2015/0378373 A1* | 12/2015 | Sprinkle | F24F 11/38 700/276 |

* cited by examiner

*Primary Examiner* — Charles Cai
(74) *Attorney, Agent, or Firm* — Farber LLC

(57) ABSTRACT

A system and method for the quantification and automatic control of energy usage for equipment through active measurement, intelligent monitoring, and predictive analysis enabling the adherence to energy budgets through automatic adjustment of the operation of the equipment.

26 Claims, 5 Drawing Sheets

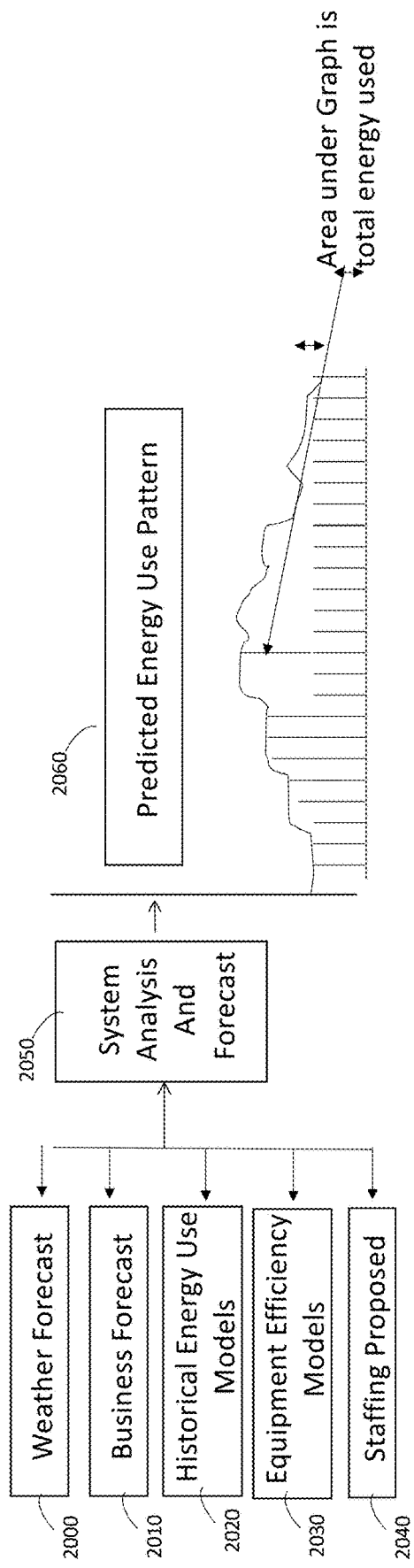
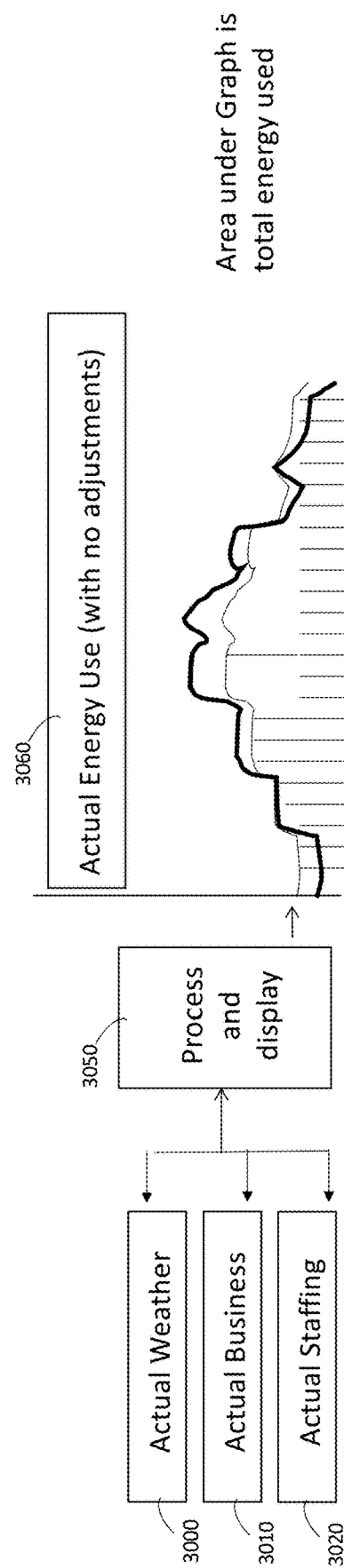
FIG. 3
FIG. 4

ENERGY SAVINGS QUANTIFICATION MEASUREMENT AND BUDGET CONTROL SYSTEM

FIELD OF THE INVENTION

The present invention relates to systems and methods for monitoring and managing energy consumption and the wide-scale distribution of intelligent energy management devices that provide near real-time measurement and micro-adjustments to energy consumption upon demand. The system addresses the quantification of energy savings through consumption measurement and intelligent monitoring so that an accurate measure of savings can be provided. The system also provides a prediction mechanism supplemented by controls enabling the adherence to energy budgets through the measurement and subsequent adjustment of these energy consumption devices.

BACKGROUND OF THE INVENTION

As energy costs escalate, the need to control consumption has increased. Whether to improve carbon emissions and positively affect greenhouse gases to prevent global warming, or to lower energy costs on the monthly utility bill, the desire to limit energy consumption is increasingly import. There are ongoing efforts by individuals, companies, utilities, government agencies, and energy management specialty companies all working towards reducing energy consumption.

To achieve energy reduction, various means have been utilized. Some of the most common include: (a) Upgrading to more efficient appliances, especially for high energy use applications such as HVAC, water heating, or cooking; (b) Leveraging intelligent control systems that employ sensors for things such as occupancy, timing, and even machine learning or artificial intelligence to predict the needs of the equipment or users in question; (c) Better insolation or sealing of spaces to reduce temperature loss such as improved windows, doors, insulation, or sealing materials; and (d) behavioral control systems including gamification and others to encourage energy reduction. A simple internet search on how to save energy will provide you with myriads of options, some better than others.

Actual savings obtained because of changes made can be somewhat difficult to quantify for a number of reasons.

First, without accurate circuit level or plug level metering and submetering capabilities, it is almost impossible to effectively allocate energy use appropriately to the specific devices or appliances whose energy use or savings you are trying to quantify. While some systems have tried to recognize devices through an energy "signature" when metering the main circuit, to date these have not been accurate or precise enough for billing level requirements.

Secondly, weather has a huge impact on energy use. Heating and cooling energy costs often form the majority of an energy budget. Unseasonal temperatures can greatly impact the amount of energy used by a facility, which can make it difficult to compare energy use to a pre-set baseline. Often those making such comparisons look at month to month cycles to form comparisons. However, large fluctuations in weather can cause substantial differences in energy use and subsequent costs. In fact, the National Oceanic and Atmospheric Administration (NOAA) has shown that in June 2021, the average temperature in the contiguous U.S. was 72.6° F., a full 4.2° F. above the average.

Further, energy bills are typically not month-long measurements, nor are they provided on calendar months. Often, there is an offset from a monthly period with most utilities. Looking at January's bill from one year and comparing it to the January bill of the previous year may not be accurate as, aside from the variables described previously, these may not comprise consistent periods. Additional days in one bill in a peak heating or cooling month can substantially alter energy consumption. In some cases, there can be as many as 6 or more days variance from year to year, which at 3.3% per day for a typical 30-day month, could add as much as 20% to an energy bill making comparisons difficult if not impossible.

Aside from year-to-year seasonal temperature variances, even differences in usage patterns from year to year can greatly impact the amount energy consumed. Children may move out of the house, new equipment may be installed, and changes in usage patterns or work schedules can occur. A lot can change from one year to the next rendering any year-to-year comparison inaccurate.

While it may be possible to estimate degradation and loss of efficiency of devices over time, it will be understood that usage patterns, maintenance, and manufacturing tolerances also affect how quickly efficiency declines in these devices. For example, regular maintenance can substantially improve the lifespan and long-term efficiency of devices. Other factors such as compressor placement (for example: inside, outside, rooftop, in the sun, in the shade) will also substantially impact both efficiency and longevity.

Companies that specialize in saving energy often make money based on a percentage of the savings obtained. For this, an accurate reflection of the savings obtained is paramount. Complex formulas and detailed legal contractual documents are exchanged between companies and their clients outlining the details around calculation of an energy baseline and measurement of variation. A substantial amount of effort is spent trying to get these as accurate as possible. However, it is assumed that a substantial amount of potential profit is lost due to all the systems and labor allocated towards measuring, calculating, and justifying these savings measurements. It would be beneficial for such organizations to have a $3^{rd}$ party standard. A system and method that they could turn to that can be used to represent these savings in a standard way to their customers.

Even those making changes or upgrades themselves will want to know how much savings were obtained with the changes that were made. To accurately measure and quantify these savings, individual users will be faced with the same issues. Here too, it would be beneficial for these individuals to have access to a 3rd party system and method to accurately measure and quantify the savings obtained in a consistent manner.

Further when comparing changes from one site to another, a consistent presentation by a standard system and method would be ideal. In addition, by having such a system and method, one could not only measure but also predict and then provide elements of automated control to leverage the system allowing one to not only set an energy budget but also adhere to it.

It is understood that changing traditional incandescent or fluorescent lights to LED lighting or upgrading a hot water heater or HVAC unit to a more energy-efficient model with a better SEER rating will undoubtedly reduce electricity usage. This holds true also for other energy efficiency upgrades, such as, replacing appliances with new energy efficient models or performing facility upgrades, such as, replacing old doors and windows with newer energy efficient doors and windows. Being able to specifically and accurately quantify the exact savings attributable to these changes, however, may prove difficult in practice due to many of the factors described above. While as a general rule, when replacing an 11 SEER rating with a 22 SEER rating should result in a 50% energy reduction, age and degradation of units and other factors make this overly simplified calculation inaccurate. The measurement of actual readings would be preferred.

It is estimated that about ½ of the energy budget of a typical household goes towards heating and cooling. With the variability inherent in the energy use of the HVAC systems, it is very difficult to budget for energy cost because weather fluctuations have such a large impact on these systems. This means the wide variability to these costs may result in surprise expenses making it difficult set a viable energy budget.

Utilities have tried to come up with ways to offer 'consistent-billing' to their customers by offering fixed monthly payments over a 6-12-month period. While helpful, these are unfortunately not much more than a monthly distribution of estimated costs resulting in customers pre-paying invoices and receiving an adjustment when the actual billing amount becomes available (whether this is a credit or a surprise bill if energy consumption or costs had been higher than expected). As such, this means that a consistent payment from month to month may be achieved, but a make-up payment at the end of the year could blow the budget entirely.

When such a bill arrives, it is too late to make changes to energy use. The expenses have already been incurred and the energy has already been used. Had one been able to predict the larger bill, one may have been willing to make more sacrifices to avoid the additional expense. With improved weather forecasts and with machine learning and accurate energy use prediction it is possible to provide fully automated controls that can help adhere to a set budget by giving the system a set of bounds to work within.

Having a system that can accurately reflect the savings obtained with smart energy controls and sensors would be beneficial for all such cases. This would not just be an informative guide but would be a way of benchmarking energy efficient devices in real world scenarios providing the most accurate system possible.

Being further able to control and manage energy use in adherence to a set budget through the intelligent prediction of energy use and the automatic control of equipment would be beneficial for setting and sticking to an energy budget and providing predictable energy costs.

SUMMARY OF THE INVENTION

Therefore, it is desired to provide a system and method to measure and monitor energy savings along with the ability to control energy usage to adhere to a predetermined budget.

It is a further desired provide a system and method that can automatically control equipment to automatically adjustable temperature setpoints.

It is a further desired to have a system self-learn usage patterns to predict energy usage based on a plurality of input data and known usage data.

In one aspect a method is provided, which allows the user to set a budget for energy use. The method may include the ability to set thresholds and parameters within, which the system can automatically make changes to equipment setpoints and operation.

In other aspects, a system is provided which enables the ability to accurately display savings at an equipment level and/or at a holistic level.

The system and methods described proposes ways of both determining the energy reduction achieved with upgrades in a reliable and quantifiable manner, as well as ways of creating an energy budget and using intelligent energy estimation and forecasting along with equipment controls to adhere to such a budget. The system will accurately report actual savings achieved and will also provide methods to adhere to such a budget by allowing for needed adjustments and controls to the equipment in real-time within a specified set of tolerance levels.

Environmental factors can affect appliance efficacy and as such, energy use is monitored by the system with a set of sensors. These include temperature, humidity, and wind sensors. These sensors provide reading and values allowing the system to compensate for smaller or larger variances between the desired inside temperature and the outside temperature in the case of heating and cooling. Similarly, a variance in indoor temperature is also measured and taken into consideration with the measurement of energy consumption of equipment such as, hot water heaters, ovens, fryers, and warmers.

A model for expected energy use is established based on known patterns and is augmented by machine learning. These patterns are analyzed by the system and a predicted energy budget is formed. Tolerance bounds are established allowing for some variability and giving the system the capability to control energy use and adhere to an energy budget. The energy budget is presented to a system administrator who can approve or adjust it along with the associated parameters that form the bounds of the control of the equipment.

In another configuration, the system allows the entry of a set of parameters giving the system flexibility to make adjustments to meet the energy budget. For example, the system can be programmed to adjust the temperature in a space upward or downward by 5° F. This setting can be changed by location or room or every place where controls exist that can be remotely managed.

In still another configuration, the system can dynamically and continually make adjustments as data continues to be provided to the system so that a maximum amount of energy can be saved. Alternatively, a periodic adjustment within pre-set boundaries (e.g., a maximum of one adjustment per hour, or an adjustment of no more than one degree per hour) can be used.

It should be noted that it is not necessary to adhere to the energy budget to the exact unit of energy measurement every month. One objective is to maintain a desired setpoint with as little change as possible, making the changes only when predictions indicate that the energy budget will be exceeded.

To make adjustments, the system uses a variety of adjustment methods. For example, energy-use impacting measurements such as, outside temperature, energy use by equipment, and occupancy sensors, can be used to measure the existence of these impacting factors. Adjustments can be made to energy use by offsetting the required temperature adjustment that must be made by the heating system in question by factoring in these offsets. For each degree of variance of outdoor temperature, based on specific knowledge of the facility, a set amount of energy savings can be expected. Likewise, the system can factor in hours of light and for direct sun when determining adjustments to obtain energy reduction in view of the energy budget. Still further, the use of other appliances/equipment can be included in the calculation. This could include, for example, determining the amount of heat that is generated by an oven in a QSR (quick serve restaurant). In this case, while the oven would never be used as heating equipment for the space, when it is in use, the amount of heat generated by the oven that is released in the space will be related to the duration and the timing of the use. This can be used by the system to calculate potential adjustments to the operation of the HVAC system for the space.

Still further, to minimize any interference between appliances, the system can take snapshot measurements at low-use times (e.g., the middle of the night or at low use periods) when few appliances are operating and interference to measuring the efficiency of the heating unit would be minimized. In such cases a better comparative measurement can be made eliminating interfering factors.

To accurately measure energy reduction requires metering at the circuit or plug level. Additionally, sensors to take environmental measurements are also required to obtain an accurate reflection of comparative energy use between two pieces of equipment taken at different times.

In one configuration, the system uses a combination of historical energy usage along with temperature forecast data to formulate energy usage predictions. Longer term forecasts are used to establish the energy budget and short-term forecasts are used as input to the system to facilitate changes in the settings.

The established energy budget can be adhered to by performing a variety of energy controls, such as, changing set-points and deferring energy consuming events. The system allows for a given amount of buy-in from users to allow for such fluctuations with modes to achieve the set energy budget.

In another example, the system may predict in a particularly hot summer and budget for a July energy usage of 8,000 kWh/month. As the month progresses, it becomes warmer than expected and cooling has taken up more of the budget than expected. Threshold settings for temperature variability are set such that evening cooling temperatures can be automatically adjusted by the system to allow for a 75° F. evening temperature instead of 72° F. in an effort to adhere to the expected budget. As time goes on, if the system continues to predict a budget overage, temperatures may be adjusted both for evening, and daytime hours. Intelligent facilities employing motion sensors and occupancy sensors will further reduce heating for unoccupied spaces, and functions such as pre-heating or cooling can be turned off or limited to save energy Threshold limits may be placed upon the system to restrict these endpoint temperature settings, but these can be adjustable. If, based on the realities faced, the system does not expect to meet the budget, alerts can be generated, and other interventions may be initiated such as reducing other energy consuming activities such as postponing oven, dryer utilization and so on. Signals may also be provided to occupants and users to attempt to modify behavior to reduce energy usage. These can take the form of warnings, alerts, or even in gamification methods to award points or other incentives to drive behavior.

For accurately reporting energy usage data, measurement sensors are employed that measure power use at the circuit level and plug level for key appliances. Using such a system, when an appliance is upgraded, changed, or optimized in some way, the accurate measurement can be obtained, kept track of and be accurately reported. Overall, energy use can be shown as the sum of these individual metered components along with a residual 'other' value for unmetered devices.

Current data is important to ensure accuracy as opposed to simply using historical data. Year-to-year seasonal variances in temperature must be factored in. For example, if the system was limited to comparing two days one year apart, such as January $10^{th}$, but one year the temperature is 10° F. warmer that the prior year, it would not be a very useful comparison to measure energy use. In such cases, the system compares energy used to compensate for each degree of variance from outside temperature on a given day. In addition, the system may also look for days close to the same calendar day where temperatures were similar to provide a more accurate estimate. Likewise, as sunshine also impacts temperature variance, cloud cover on comparative days, or ideally taking nighttime temperature comparisons is a preferred way to increase accuracy of measurement.

In still another configuration the use of equipment at certain times can be impactful on energy consumption. For example, with the installation of blinds, or tinted windows, the system could implement their use and deployment precisely when the sun is in a position when their use can have the most impact on energy usage. When cooling a space that is experiencing the full force of sunshine during the day, it would be good to have fully comparable data such tinted windows versus traditional windows to measure an exact scenario to better determine potential energy reduction. Measuring the delta in the evenings would not provide very good data about potential energy reduction because the situation is not comparable to full sunshine. The type and timing of measurements to determine savings should be at least partly based on the upgrades installed. That said however, when looking for overall savings, the system must still compare energy use over a given time under similar circumstances.

Therefore, a need exists for a system that can measure and accurately quantify the savings obtained through the application of energy reducing techniques including both hardware upgrades and procedural changes to reliably report and demonstrate reduction. It would be still further beneficial to have such a system capable of automatically altering the energy consumption to adhere to a predetermined energy budget by applying changes within a predetermined set of thresholds or tolerance levels.

In one configuration, a system for automatically controlling energy consumption of at least one equipment operating in a facility is provided comprising: a computer coupled to a network and having a storage, the storage having energy budget data for a first time period saved thereon, and the storage having operational parameter data for the facility saved thereon. The system further comprises: a controller associated with the at least one equipment and coupled to the computer via the network, the controller detecting the operation of the at least one equipment to generating energy use data, which is transmitted to the computer, and an environmental sensor coupled to the network and generating environmental data relating to environmental conditions outside the facility, the environmental data transmitted to the computer. The system still further comprises: at least one facility sensor coupled to the network and generating facility data, the facility data transmitted to the computer. The system is provided such that the software executing on the computer receives predicted environmental data comprising a prediction of environmental conditions outside the facility for a first future time period that overlaps with the first time period, and the software executing on the computer compares the energy use data, the environmental data, the facility data, the predicted environmental data, the energy budget data, and the operational parameter data to generate an operation program. Finally, the system is provided such that the software executing on the computer automatically transmits instructions to the controller to adjust the operation of the at least one equipment based on the operation program.

In another configuration, a method for automatically controlling energy consumption of at least one equipment operating in a facility with a computer coupled to a network and having a storage is provided, the method comprising the steps of: saving energy budget data for a first time period on the storage, saving operational parameter data for the facility on the storage, and detecting the operation of the at least one equipment with a controller associated with the at least one equipment and coupled to said computer via the network to generating energy use data and transmitting the energy use data to the computer. The method further comprises the steps of: generating environmental data relating to environmental conditions outside the facility with an environmental sensor coupled to the network and transmitting the environmental data to the computer, and generating facility data with at least one facility sensor coupled to the network and transmitting the facility data transmitted to the computer. The method still further comprises the steps of: receiving predicted environmental data comprising a prediction of environmental conditions outside the facility for a first future time period that overlaps with the first time period with software executing on the computer, and comparing the energy use data, the environmental data, the facility data, the predicted environmental data, the energy budget data, and the operational parameter data to generate an operation program with the software executing on the computer. Finally, the method comprises the step of: automatically transmitting instructions to the controller to adjust the operation of the at least one equipment based on the operation program with the software executing on the computer.

Other objects of the invention and its particular features and advantages will become more apparent from consideration of the following drawings and accompanying detailed description.

BRIEF DESCRIPTION OF THE DRAWINGS

FIG. 3. is an overview showing how the system predicts energy use.

FIG. 4. is an overview showing how the system displays the actual energy use.

DETAILED DESCRIPTION OF THE INVENTION

Figure 1:
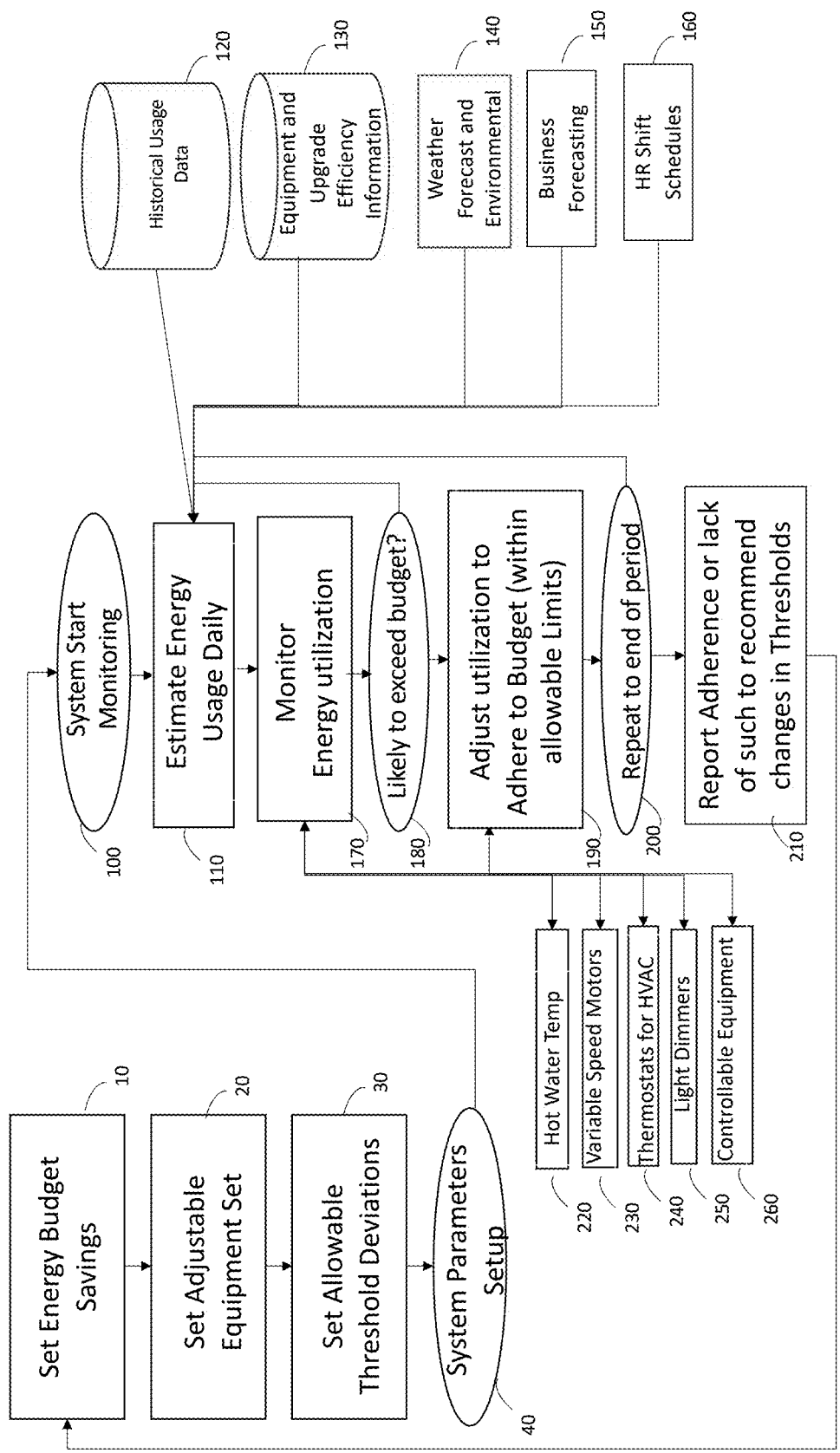
FIG. 1 is a functional overview of the setting up of the monitoring and adjustment system.

A model for expected energy use may be established based on known patterns and may further be augmented by machine learning. In one example, a temperature variance of 5° F. may be set with an optimal setting of 68° F. In this example, the temperature may be adjusted as low as 63° F. in winter months or as high as 73° F. in summer months to reduce energy consumption when attempting to adhere to an energy budget.

While the above may appear as extreme ranges, in practice when "normal" seasonal cycles occur, the change or variance made by the system may often be minimal. In some cases, such as an unseasonably warm winter, the system may save more than the predicted budget without any adjustments. Parameters to keep this as a buffer for future months may also be available as settings in the system.

As an example, the system may establish a baseline for energy use based on historical patterns of past energy use. This baseline is used to estimate usage and is supplemented with predicted values of external variables such as weather forecasts. An industry standard called "Caltrack" may be used to measure the impact of weather against a given historical energy baseline. Modeling may be done by site by entering previously recorded adjustment data. A change in utility rates may also signal potential budget overage if no adjustments are made.

In the case of specific types of facilities, such as hotels or restaurants, booking levels and reservations may be used to create this baseline. For restaurants, business forecasts such as meals to be cooked, or foot traffic may be used. In office buildings, the level of occupancy and/or headcount can be used.

In another example, temperature forecasts may be analyzed for upcoming days/weeks/month. If it is determined that it appears it will be colder than usual, it will be understood that a heating system will have to work harder to heat a space to a desired temperature. Similarly, if exterior temperatures are hotter or more humid than usual or expected, HVAC systems will have to work harder to cool the space to the desired temperature. These temperature forecasts and the efficiency ratings of equipment are used to form a baseline of expected energy usage based on a pre-set temperature setting.

As an example, it may be desired to adhere to a given energy budget and assume that it is acceptable to compromise on the interior temperature to achieve the budget. The system may be programed to compensate for an overly warm day but may be programmed to cool the space to a lesser degree. This would result in less energy used as compared to cooling the space to the "normal" desired temperature. The system then, provides a mechanism to enter the allowable variance of temperature to compensate accordingly.

In another example, in a given month it could be expected to reduce energy usage by 20% or to come up with a bill of X$ or X number of kWh. It should be noted that this initial 20% reduction is typically based on a set of upgrades made to the facility such as installing more efficient appliances and lighting. As the month progresses, the outside temperature is at an expected level, however, about halfway through the month the forecast changes predicting higher than usual temperature and humidity levels. The system has been programmed to allow for a 5° F. variance in temperature and knowing that the facility will likely exceed the energy budget based on the new forecast, the system starts to adjust setpoints up from a usual 68° F. to 70° F. even before the exterior heat and humidity rise. This two-degree buffer can make a difference of as much as 2-3% of the energy usage at the end of the month.

In the above example, it can be seen that the accumulated savings that has been achieved before the forecasted higher than normal heat and humidity occur provides a buffer of energy usage that can offset the higher-than-normal energy usage during the period of high heat and humidity. Depending on the magnitude of buffer accumulated and the revised forecast (forecasts get more accurate as time nears), the system could decide to adjust the temperature setpoints to a greater or lesser amount to achieve the energy budget. This can be done on an ongoing basis as new information is fed into the system and analyzed by machine learning. The goal is to keep the temperature consistent with the desired setpoints without negatively impacting comfort or function. In most cases, only minimal changes (and in many cases no changes) are made.

While we have described a heating or cooling system in the above example, additional savings can be achieved by adjusting hot water temperatures, variable-speed motors, drawing blinds, and cycling fans and other equipment as needed.

In the case of energy savings and the accurate capture of the savings achieved through the replacement of equipment or other adjustments, the accurate measurement of key equipment is key. For example, if we replaced the HVAC unit with a higher efficiency one, we could measure the actual energy use over time of the new equipment and compare it to the former equipment.

In some cases, earlier equipment measurement data is not available from the sensors and these sensors are often installed by the company performing the upgrades. In such cases, historical billing data can be used to estimate historical usage of such devices as a percentage of overall energy cost. Referring now to the drawings, wherein like reference numerals designate corresponding structure throughout the views. The following examples are presented to further illustrate and explain the present invention and should not be taken as limiting in any regard.

As shown in FIG. 1 an overview of the process of setting up the system is presented. At this point, it is assumed that the system has been installed along with the sensors and controls for the equipment to be monitored. Such equipment is depicted with some examples in (220, 230, 240, 250 & 260).

An energy budget has been created by the system (10) which is then adjusted or set by the administrator. This budget is initially set based on prior energy usage and compensation made for upgrades to the system. Once historical measurements are available with real data, the budget created becomes increasingly accurate.

The system has access to both measurement and control of a variety of equipment (220, 230, 240, 250 & 260). In one configuration, the operator may select which equipment will be automatically manageable (20).

For the equipment in the adjustable equipment set (20), the parameters or thresholds (30) are set up allowing the system to vary the settings within the boundaries. For example, a thermostat for HVAC may have a 5-degree threshold allowance upward or downward.

Once completed for all the adjustable equipment set (20), the system parameters (40) are setup, and the system can begin monitoring (100).

The system sets up a daily energy use forecast (110) based on inputs received from various sources including historical usage data (120), information about the equipment being used, such as, efficiency data (130), and through external feeds for weather and environmental data (140). These can be calculated and predicted based on weather forecasts and can be modeled by the system in terms of how much more or less energy is calculated to be consumed. Business forecasts (150) and occupancy predictions of staffing (160) may also be used by the system so it can accurately predict the energy use for the day.

Data about historical weather may be kept in tables. Historical rates and consumption data may also be kept in a table. In one configuration, the system is able to keep this data in 15-minute increments, however, when not available, data may be extrapolated by the resolution that is available.

Consider the historical weather data for a given area. It can include temperature, humidity, daylight hours, and even sunlight hours. Take as an example just the temperature data for the sake of illustration. This can be either pulled from a historical weather service or it can be actual temperature sensor readings read and stored over time for a given site. This latter is most accurate, but may not be available at the time of setting up the system. However, by taking these readings and combining them with a weather station feed in subsequent years, the system becomes more accurate with forecasting and prediction/estimating.

In the example of temperature, regardless of the source, a time-based table is stored showing measurements yearly as well as an average across years. The predicted weather is based on the yearly average but also weighted to the most recent years to account for warming or cooling trends. This is the typical baseline temperature used to forecast the energy usage in advance when establishing the energy budget. With warming trends considered, as well as the most recent utility rates, an estimate may be made of the expected daily temperature for a location.

Correlated with the temperature is the historical energy usage data. Here, the energy use may also be adjusted to account for business volume and other non-temperature related variables such as occupancy and occupancy density. The key being that there is a table of entries showing expected energy use based on the adjusted average temperatures.

Looking now at a current month, the system uses these tables to create the expected energy budget for the month. If there is a surplus or deficit from prior months (i.e., more or less energy was consumed in prior months), this can be used as a fudge factor for the existing month also.

The system then creates a third table which includes a dynamic temperature forecast based on near-term forecasting methods. These are more accurate predictions and can be quite different from the averages in previous historical data.

The differential between the interior desired setpoint temperature, and the outside temperature, determine how hard the heating or HVAC systems must work, and subsequently how much energy must be expended to maintain the desired temperature.

This new table is updated as the forecasts change, and then finally updated with the actual temperature once the data/time has passed. It is really a rolling extension of the historical temperature data forecasted into the future.

A fourth table is then kept which includes the dynamic adjustments made to setpoints with the forecasted savings. It is later matched against the actual energy usage to also help the system perform machine learning and improve estimation. The allowable thresholds (e.g., plus or minus 5 degrees) set the bounds for how much the internal settings can be adjusted in order to achieve the energy budget.

The system then monitors the energy use (170) by reading data from a variety of equipment that is available either through the electrical panel or from submetering equipment. (220, 230, 240, 250, 260).

A determination is made based on predicted energy use for the remainder of the time period, usually a month or the billing period, as to whether or not the energy budget likely to be met or exceeded (180).

If it is determined that the energy budget will in all likelihood be exceeded, the operation of the equipment (220, 230, 240, 250, 260) may be adjusted (190) within the threshold deviation allowances (30) set in the system setup parameters (40).

This process continues (200) until the end of the energy measurement period, which may correspond to a utility billing period.

It should be noted that as changes are made, or not made, there is an ongoing rolling value of energy use that is compared to the energy budget when making the (180) determination whether the budget may be exceeded.

For example, if it's been unseasonably warm and less heating has been necessary for the beginning of the month, even if colder than average temperatures return later in the month, the budget for the month may not be exceeded (180) due to this "surplus" (reduced consumption) of energy.

Changes made to the energy budget (210) are reported back and saved to ensure that future energy budget recommendations and settings more accurate with time.

Figure 2:
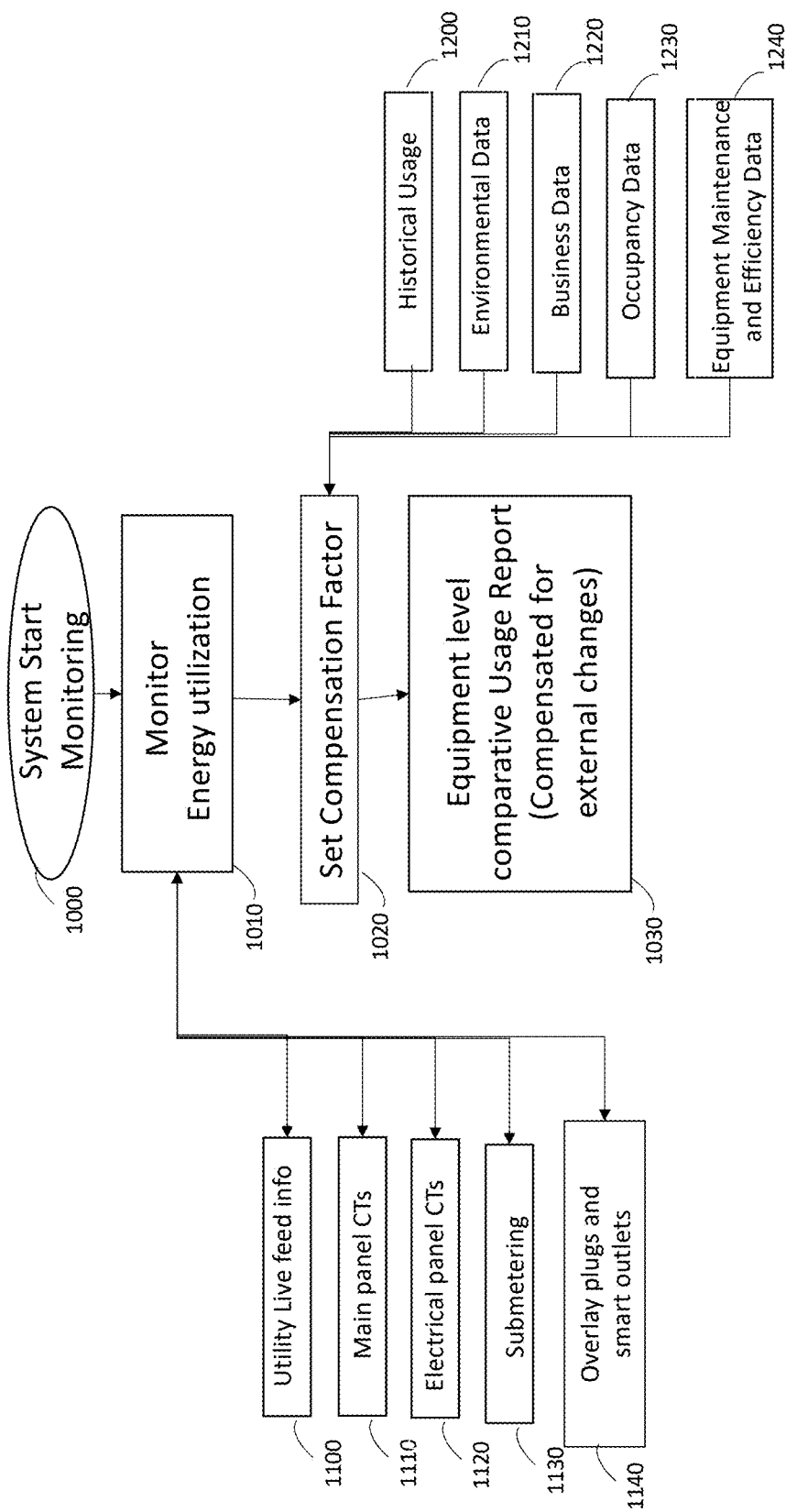
FIG. 2 is a functional overview of the process of measuring and reporting compensated energy savings.

Turning now to FIG. 2, a functional overview of the process of measuring and showing energy savings is depicted.

The system monitors (1000) by reading energy use data (1010) from a variety of sources including feeds from the utility (1100), current transformers ("CT"s) are attached to the main panel (1110) with individual CTs on circuits (1120), submetering equipment installed on individual appliances or groups (1130) and overlay plugs or other smart outlets able to report energy use (1140).

The system also takes into consideration other data to come up with a compensation factor (1020) to compare prior readings with current readings and detect differences. For example, if an air conditioning unit has been replaced in a given local, it would be advantageous to determine how much the new equipment reduces energy consumption. To come to an accurate measurement, it is important to compare the energy used under identical circumstances. While this is not possible, it is possible to compensate for differences knowing how much to adjust based on external factors.

The system uses data from historical energy use (1200), environmental data (1210), such as, temperature, wind, sun, rain etc. The system may also use business data (1220). Business data may be significant because numerous and frequent use of business equipment may add significantly to heat making cooling more difficult in the hot summer months, or heating easier in the cold winter months. Occupancy data (1230) may also used as body temperatures can impact room temperature, as does frequent door opening, especially exterior doors. Finally, equipment efficiency and maintenance data (1240) may also be used.

In one configuration, an HVAC unit has been upgraded and now it would be desirable to get a to measurement of actual energy reduction. In this example, the old HVAC unit consumed 40 kWh on a 90° F. sunny day last year on the same date. This year however, business has increased, but the temperature is lower (80° F.) and is it cloudy. Comparing energy use without compensation would not be accurate. Based on historical data processed by machine learning and predictive analysis it is understood that intense sunny days impact room temperature in a certain way throughout the day based on window placement. The system has measured the impact on energy and learned the effect by seeing the change in energy use on two similar days when one was sunny, and the other was not. Similarly, the system has learned the impact of business increases, and occupancy changes. The data is thus processed what while the new energy use was 20 kWh, that must be multiplied to compensate for the 10° F. outdoor differential (0.15) and the changes in occupancy and business volume (0.05). With the compensation factor of 1.2 the comparative reduction would be 24 kWh (or a reduction of 16 kWh).

These formulas are learned based on actual measurements of the existing system. The expectation is that if the old system would require 1.2 times the energy to cool the room in the changed conditions, we would compare the new system in the same way. For example, rather than look at the former cost of last year's measurement as 40 kWh which was the actual usage, we could say that in the current conditions (10° F. less outside temperature and the added business volume) the usage would have been 24 kWh.

An equipment level report (1030) is calculated and shown for each measured piece of equipment and can be used with the compensation factor to provide an accurate savings when upgrades are made.

Turning now to FIG. 3, a functional overview of the process of measuring and predicting the energy savings is provided. The system (2050) analyzes input data from weather forecasts (2000) to come up with the compensation and adjustment criteria expanded in FIG. 2. These weather forecasts (2000) become increasingly accurate for upcoming days and are used to plan for energy use on a given budget. Take a simple example whereby we may have 3 kWh remaining on the last day of the month to stay within budget. With the forecast being colder than usual, it is understood that to keep the desired baseline temperature would require using 5 kWh on that day. To compensate, adjustment parameters (shown in FIG. 1. (30)) allow for the varying of the temperature by up to 5° F. Calculations show that a 3° F. change would save the 2 kWh necessary to stay within budget.

Business Forecast (2010) data is also used to predict the influence of ovens on inside temperature as well as the implications of increased foot traffic. Staffing (2040) would add a compensation factor for the number of people in the space. Knowledge about the age of the equipment and the efficiency models (2030) and historical usage patterns (2020) also help the system to analyze (2050) the usage and create an expected pattern (2060) for the day based on the expected energy use over time. The overall area under the graph shows the total energy use for the time period depicted in the graph. This graph can be generated as an aggregate energy use or a per-equipment graph.

Turning now to FIG. 4, a functional overview of the process of displaying the actual energy usage and mapping that against the predicted pattern established in FIG. 3 is shown. In this case, actual weather (3000) actual business data (3010) and actual staffing (3020) factor into the use and are kept as reference for future estimations. The system processes and displays (3050) the actual use read from sensors show in FIG. 2 (1100, 1110, 1120, 1130, 1140) and the energy use graph is shown on the expected usage determined from FIG. 3 (2060). Again, this graph can be generated as an aggregate energy use or a per-equipment graph.

Figure 5:
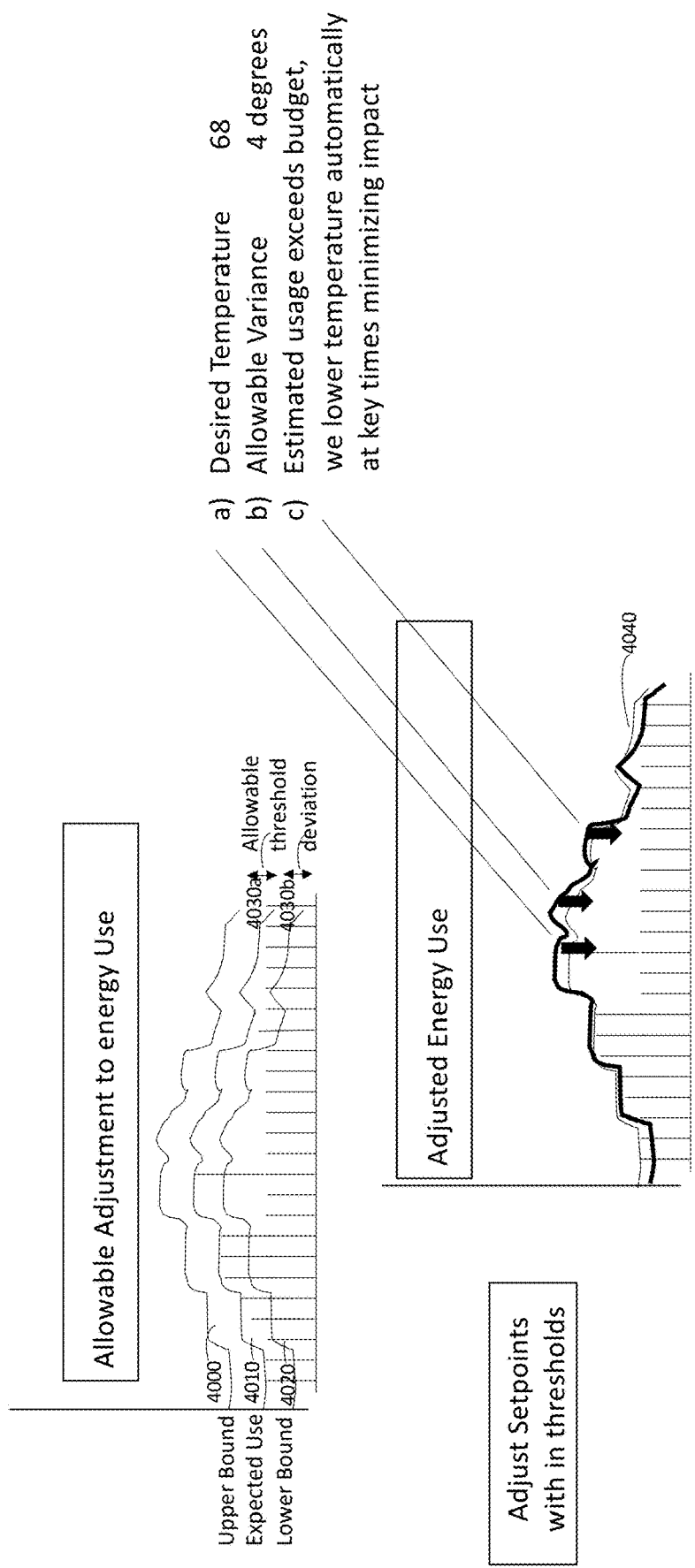
FIG. 5 is an overview showing the tolerance levels of the system to adjust the energy use and how the system adjusts energy use.

Turning now to FIG. 5, the adjusted energy use by the system based on the upper bound (4000) and lower bound (4020) is depicted. The expected use (4010) can be adjusted by the allowable threshold variation (4030a and 4030b). The energy use can be adjusted up (4030a) or down (4030b) as needed.

While typically energy use would be moved down to reduce energy usage, however, if the equipment has been working below the comfort level, it may increase the energy use to bring the temperature back up more quickly. At other times the energy use cannot be adjusted beyond the given upper or lower bound and the energy use may increase beyond these thresholds (i.e., we cannot make up the savings in energy use while maintaining the allowable threshold). In such cases, the system simply reduces energy use as much as is allowable and builds up a deficit in the energy budget for the time period (e.g., typically a month). When the cold spell passes, the system will then try and compensate for the deficit making up some of the savings in the remainder of the month or in the following months.

The graph in (4040) shows the adjusted energy use overlayed on the expected use. Again, these curves can be drawn by the system on a per device level or as an aggregate usage.

Figure 6:
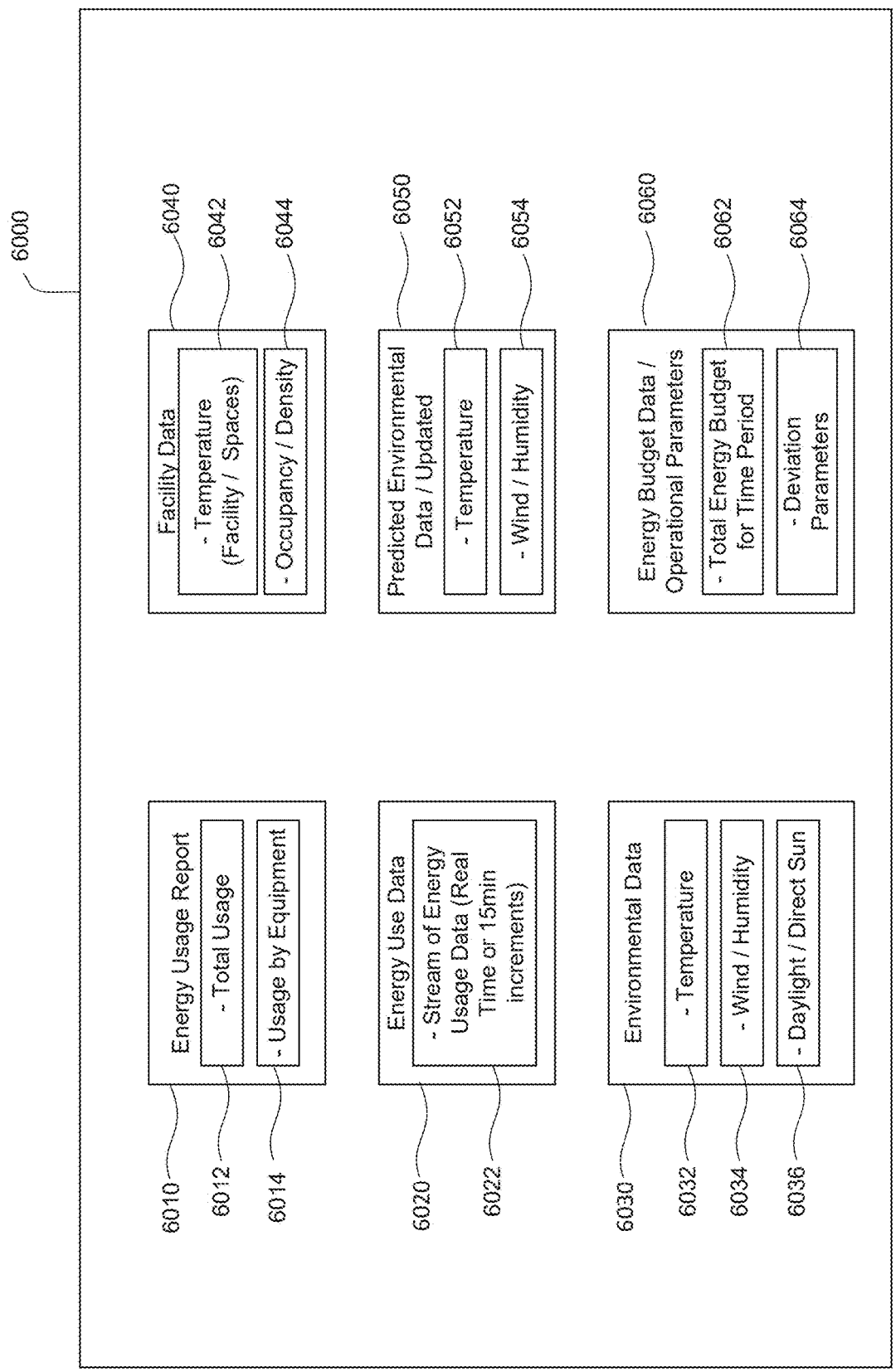
FIG. 6 is an illustration of a screen that may display various information to a user according to the monitoring and adjustment system of FIG. 2.

FIG. 6 shows a graphic user interface (6000) that may be presented to a user on a computer. The graphic user interface (6000) allows for a user to be presented with various information including, for example, but not limited to, an Energy Usage Report (6010) that may provide a total energy usage (6012) and may provide for usage by equipment (6014). It is contemplated that numerous different equipment will be individually monitored to provide detailed energy usage.

The graphic user interface (6000) may also present Energy Usage Data (6020), which may comprise in one configuration a Stream of Energy Usage Data (6022). The Stream of Energy Usage Data (6022) may be provided at timed intervals (e.g., every 15 mins), or may comprise essentially a real-time update on actual energy usage.

The graphic user interface (6000) may also present Environmental Data (6030), which may comprise in one configuration a Temperature (6032), Wind and/or Humidity (6034), and Daylight and/or Direct Sun (6036) on the facility.

The graphic user interface (6000) may also present Facility Data (6040), which may comprise Temperature (6042) in the facility and/or in individual spaces withing the facility, and Occupancy and/or Occupancy Density (6044) within one or more portions of the facility.

The graphic user interface (6000) may also present Predicted Environmental Data (6050), which may comprise in one configuration a Temperature (6052), and Wind and/or Humidity (6054). It is understood that the Predicted Environmental Data (6050) will be updated periodically to provide better predictive data as the current date gets closer to the prediction date.

The graphic user interface (6000) may also present Energy Budget Data/Operational Parameter Data (6060), which may show a Total Energy Budget for the Time Period (6062), and may present the Deviation Parameters (6064) for the operation of the equipment at the facility being monitored and controlled. The Energy Budget Data may comprise the budget that is calculated by the system for a given time period (e.g., a month or a utility billing period). This could be presented as a fixed number and/or may be shown as a countdown number that decreases as energy is being consumed throughout the time period. The Deviation Parameters may comprise the threshold deviations that are allowable to the system and may comprise fixed numbers and/or may be displayed showing the current settings whether above or below the setpoint for each equipment and/or space.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for automatically controlling energy consumption of at least one equipment operating in a facility comprising:
   a computer coupled to a network and having a storage;
   said storage having energy budget data for a first time period saved thereon;
   said storage having operational parameter data for the facility saved thereon;
   a controller associated with the at least one equipment and coupled to said computer via the network, said controller detecting the operation of the at least one equipment to generate energy use data, which is transmitted to said computer;
   an environmental sensor coupled to the network and generating environmental data relating to environmental conditions outside the facility, the environmental data transmitted to said computer;
   at least one facility sensor coupled to the network and generating facility data, the facility data transmitted to said computer;
   software executing on said computer receiving predicted environmental data comprising a prediction of environmental conditions outside the facility for a first future time period that overlaps with the first time period;
   said software comparing the energy use data, the environmental data, the facility data, the predicted environmental data, the energy budget data, and the operational parameter data to generate an operation program; and
   said software executing on said computer automatically transmitting instructions to said controller to adjust the operation of the at least one equipment based on the operation program.

2. The system for automatically controlling energy consumption of claim 1, wherein,
   said storage has historical environmental data relating to past environmental conditions outside the facility saved thereon;
   said storage has historical energy usage data for the at least one equipment relating to past energy usage for the at least one equipment saved thereon; and
   said software executing on said computer correlating the historical energy usage data and the historical environmental data to generate correlated historical energy usage data;
   wherein said software executing on said computer uses the correlated historical energy usage data in generating the operation program.

3. The system for automatically controlling energy consumption of claim 2, wherein the historical environmental data and the historical energy usage data are each saved in a table.

4. The system for automatically controlling energy consumption of claim 3, wherein the environmental data is selected from the group consisting of: temperature, humidity, daylight hours, direct sunlight hours on the facility, and combinations thereof.

5. The system for automatically controlling energy consumption of claim 4, wherein the historical energy usage data and the historical environmental data include date information such that the correlated historical energy usage data correlating the energy usage to date and temperature.

6. The system for automatically controlling energy consumption of claim 5, wherein the energy budget data is generated and modified periodically by the correlated historical energy usage data.

7. The system for automatically controlling energy consumption of claim 1, wherein the facility data is selected from the group consisting of: temperature data inside the facility, occupancy data, occupancy density data and combinations thereof.

8. The system for automatically controlling energy consumption of claim 1, wherein,
said software executing on said computer receives updated predicted environmental data for a second future time period;
said software executing on said computer modifies the operation program based on the energy use data, the environmental data, the facility data, the updated predicted environmental data, the energy budget data, and the operational parameter data to generate a modified operation program; and
said software executing on said computer automatically transmitting instructions to said controller to adjust the operation of the at least one equipment based on the modified operation program.

9. The system for automatically controlling energy consumption of claim 8, wherein the updated predicted environmental data comprises a dynamic temperature forecast that is saved in a dynamic temperature forecast table.

10. The system for automatically controlling energy consumption of claim 1, wherein said operational parameter data comprises thresholds and parameters within, which said software executing on said computer automatically sends instructions to said controller to implement changes to equipment setpoints and operation.

11. The system for automatically controlling energy consumption of claim 1, wherein said software executing on said computer generates a report accounting for energy usage for the at least one equipment for the first time period.

12. The system for automatically controlling energy consumption of claim 11, wherein said software executing on said computer comprises a graphic user interface for displaying the report.

13. The system for automatically controlling energy consumption of claim 12, wherein the graphic user interface displays information selected from the group consisting of: the energy use data, the environmental data, the facility data, the predicted environmental data, updated predicted environmental data, the energy budget data, the operational parameter data, and combinations thereof.

14. The system for automatically controlling energy consumption of claim 1, wherein the energy use data, the environmental data and the facility data are received by said software executing on said computer in real-time.

15. A method for automatically controlling energy consumption of at least one equipment operating in a facility with a computer coupled to a network and having a storage, comprising the steps of:
saving energy budget data for a first time period on the storage;
saving operational parameter data for the facility on the storage;
detecting the operation of the at least one equipment with a controller associated with the at least one equipment and coupled to said computer via the network to generate energy use data and transmitting the energy use data to the computer;
generating environmental data relating to environmental conditions outside the facility with an environmental sensor coupled to the network and transmitting the environmental data to the computer;
generating facility data with at least one facility sensor coupled to the network and transmitting the facility data transmitted to the computer;
receiving predicted environmental data comprising a prediction of environmental conditions outside the facility for a first future time period that overlaps with the first time period with software executing on the computer;
comparing the energy use data, the environmental data, the facility data, the predicted environmental data, the energy budget data, and the operational parameter data to generate an operation program with the software executing on the computer; and
automatically transmitting instructions to the controller to adjust the operation of the at least one equipment based on the operation program with the software executing on the computer.

16. The method for automatically controlling energy consumption of claim 15, further comprising the steps of:
saving historical environmental data relating to past environmental conditions outside the facility on the storage;
saving historical energy usage data for the at least one equipment relating to past energy usage for the at least one equipment on the storage;
correlating the historical energy usage data and the historical environmental data to generate correlated historical energy usage data with the software executing on the computer;
wherein the software executing on the computer uses the correlated historical energy usage data in generating the operation program.

17. The method for automatically controlling energy consumption of claim 15, wherein the historical environmental data and the historical energy usage data are each saved in a table.

18. The method for automatically controlling energy consumption of claim 17, wherein the environmental data is selected from the group consisting of:
temperature, humidity, daylight hours, direct sunlight hours on the facility, and combinations thereof.

19. The method for automatically controlling energy consumption of claim 18, wherein the historical energy usage data and the historical environmental data include date information such that the correlated historical energy usage data correlating the energy usage to date and temperature.

20. The method for automatically controlling energy consumption of claim 19, wherein the energy budget data is generated and modified periodically by the correlated historical energy usage data.

21. The method for automatically controlling energy consumption of claim 15, wherein the facility data is selected from the group consisting of: temperature data inside the facility, occupancy data, occupancy density data and combinations thereof.

22. The method for automatically controlling energy consumption of claim 15, further comprising the steps of:
receiving updated predicted environmental data for a second future time period with the software executing on the computer;

modifying the operation program based on the energy use data, the environmental data, the facility data, the updated predicted environmental data, the energy budget data, and the operational parameter data to generate a modified operation program with the software executing on the computer; and automatically transmitting instructions to the controller to adjust the operation of the at least one equipment based on the modified operation program with the software executing on the computer.

23. The method for automatically controlling energy consumption of claim 15, further comprising the step of:

generating a report accounting for energy usage for the at least one equipment for the first time period with the software executing on the computer.

24. The method for automatically controlling energy consumption of claim 23, wherein the software executing on the computer includes a graphic user interface for displaying the report.

25. The method for automatically controlling energy consumption of claim 24, further comprising the step of:

displaying information on the graphic user interface selected from the group consisting of: the energy use data, the environmental data, the facility data, the predicted environmental data, updated predicted environmental data, the energy budget data, the operational parameter data, and combinations thereof with the graphic user interface.

26. The method for automatically controlling energy consumption of claim 15, further comprising the step of:

receiving in real-time the energy use data, the environmental data and the facility data with the software executing on the computer.

* * * * *